United States Patent
Connell

[11] 3,893,300
[45] July 8, 1975

[54] EXTERNAL COMBUSTION ENGINE AND ENGINE CYCLE

[75] Inventor: Joseph A. Connell, Fountain Valley, Calif.

[73] Assignee: NRG Incorporated, Phoenix, Ariz.

[22] Filed: Jan. 10, 1974

[21] Appl. No.: 432,139

Related U.S. Application Data

[63] Continuation-in-part of Ser. No. 355,956, April 30, 1973, abandoned.

[52] U.S. Cl............ 60/683; 60/39.18 C; 60/39.25
[51] Int. Cl.² ......................................... F02C 1/00
[58] Field of Search..... 60/39.46, 39.18 A, 39.18 B, 60/39.18 C, 59 T, 59 R, 39.03, 682, 683, 684, 39.25; 417/510

[56] References Cited
UNITED STATES PATENTS

| | | | |
|---|---|---|---|
| 747,316 | 12/1903 | Burger | 60/39.46 |
| 1,813,543 | 7/1931 | Pescara | 60/59 T |
| 2,298,625 | 10/1942 | Larrecq | 60/59 T |
| 2,438,635 | 3/1948 | Haverstick | 60/59 T |
| 2,493,509 | 1/1950 | Traupel | 60/59 T |
| 2,667,299 | 1/1954 | Gustafson | 417/510 |
| 2,820,348 | 1/1958 | Sauter | 60/59 T |
| 2,939,286 | 6/1960 | Pavlecka | 60/59 T |
| 2,966,776 | 1/1961 | Taga | 60/59 T |
| 3,237,847 | 3/1966 | Wilson | 60/59 R |
| 3,521,446 | 7/1970 | Maljanian | 60/39.25 |
| 3,621,654 | 11/1971 | Hull | 60/59 T |
| 3,621,657 | 11/1971 | Jurisch et al. | 60/39.25 |
| 3,756,022 | 9/1973 | Pronovost et al. | 60/59 R |
| 3,814,537 | 6/1974 | Stoltman | 60/39.25 |

FOREIGN PATENTS OR APPLICATIONS

| | | | |
|---|---|---|---|
| 116,742 | 1/1901 | Germany | 60/682 |

*Primary Examiner*—William L. Freeh
*Assistant Examiner*—Robert E. Garrett
*Attorney, Agent, or Firm*—Knobbe, Martens, Olson, Hubbard & Bear

[57] ABSTRACT

An engine, particularly adapted for use in automobiles, in which ambient air is compressed in a positive displacement compressor and then heated in a heat exchanger. The heat exchanger output drives a rotary turbine which, in turn, drives the positive displacement compressor and produces output power. Any source of heat, such as the combustion products from a fuel burning chamber, may be used to apply heat to the heat exchanger. A heat storage device is also incorporated into the system to provide power during sudden turbine demands.

2 Claims, 3 Drawing Figures

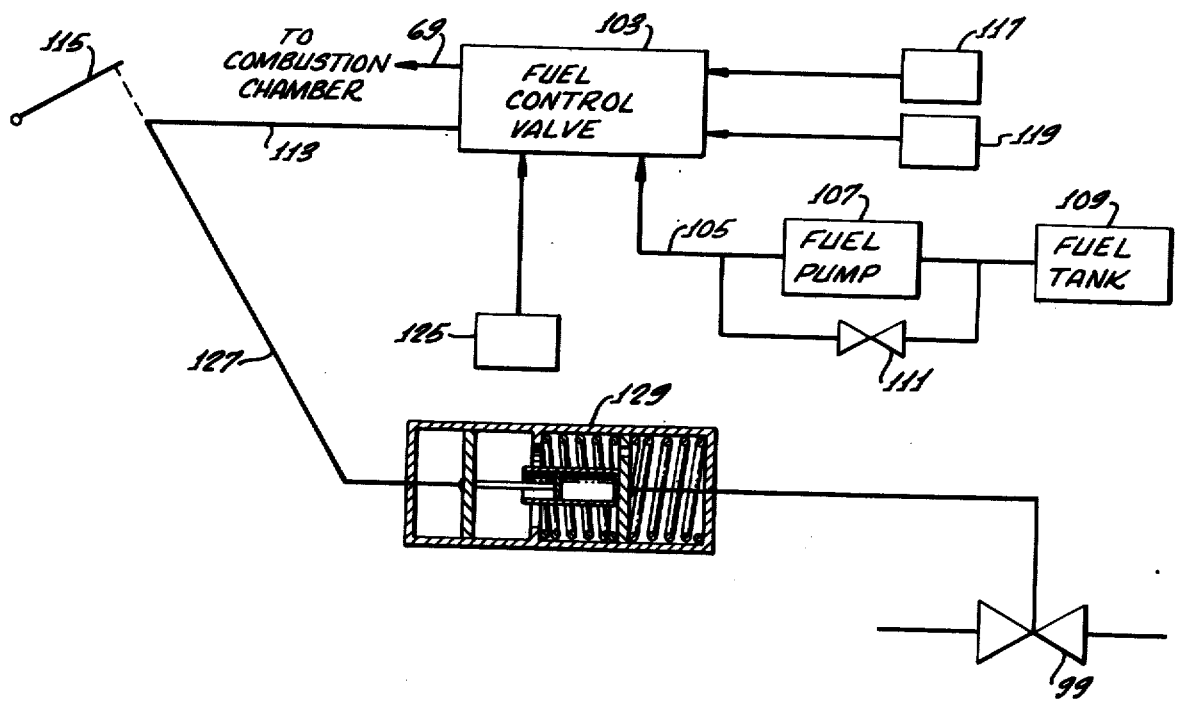
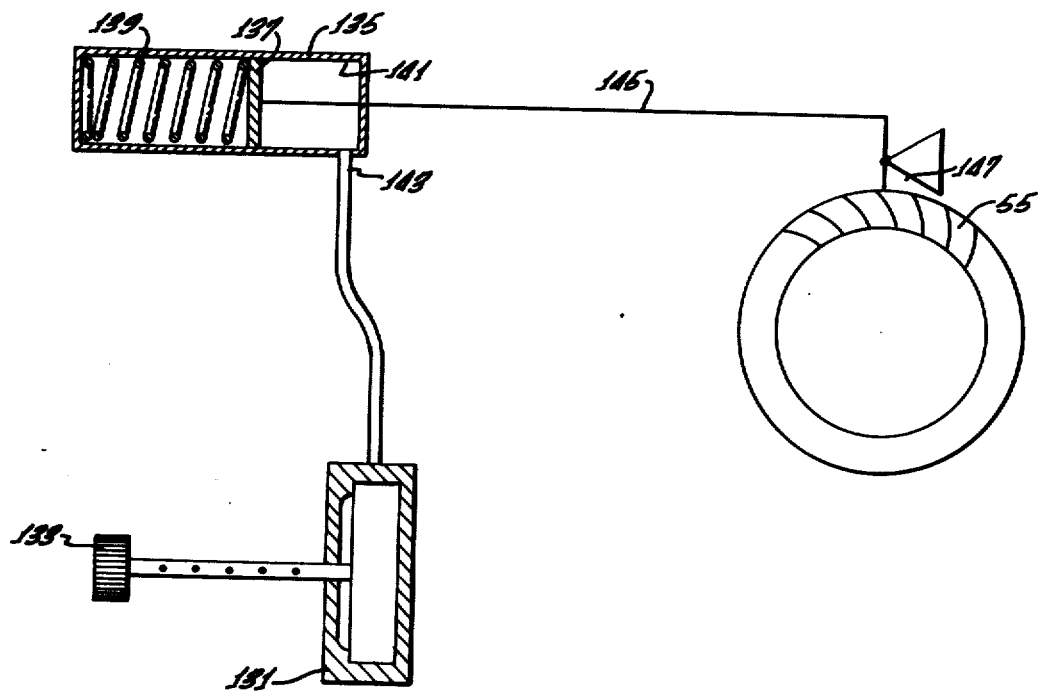

EXTERNAL COMBUSTION ENGINE AND ENGINE CYCLE

RELATED APPLICATION

This application is a continuation-in-part of copending application Ser. No. 355,956, filed Apr. 30, 1973 and now abandoned, entitled EXTERNAL COMBUSTION ENGINE AND ENGINE CYCLE.

BACKGROUND OF THE INVENTION

This invention applies to apparatus for producing power, and more particularly, vehicle motive power, and lends itself to external combustion of fuels thereby reducing the levels of toxic combustion by-products.

The gasoline internal combustion 4-cycle engine has seen almost exclusive use in the automotive industry since its inception. Both the high efficiency of these engines and the relatively high power output per size and weight of the engine have assured its dominance over the years. Only recently has the major drawback of these engines, namely air pollution by-products, become a sufficiently significant problem to require investigation into alternative vehicle motive devices. The inherent difficulty in designing a low pollution internal combustion gasoline engine may be explained as follows. In the operation of a 4-cycle engine the fuel and air mixture, in the case of standard gasoline engines, or the air to be mixed with fuel, in the case of a diesel engine, must first be compressed during the compression stroke. At the end of the compression stroke the fuel and air mixture is ignited, or, in the case of a diesel engine, fuel is injected into the cylinder, and combustion occurs to drive the piston downward producing torque on a crank shaft. In order to make such engines operate efficiently, the compression ratio, that is, the ratio between the volume of the cylinder at the top and bottom of its stroke, must be as high as possible. In the diesel engine, compression ratios may exceed 20:1. In the standard gasoline engine, however, the compression ratio is severely limited by the anti-knock characteristics of the fuel being used. Thus, for example, standard gasoline engines have a compression ratio in the order of 7:1 to 10:1. As this ratio is increased, the refinement of the gasoline must be improved or larger quantities of antidetonant ingredients, such as lead, must be added to the gasoline in order to stop the gasoline and air mixture from reaching the combustion temperature due to the adiabatic temperature increase in the cylinder during compression. These high compression ratios are responsible, to a great extent, for the pollution by-products generated by the engine, since the anti-knock additives themselves introduce certain pollutants, and since the fuel and air mixture burns under conditions which result in noxious by-products. Therefore, in using the standard 4-cycle engine, the engineer is constantly compromising either engine efficiency or pollution output, one against the other, in order to produce a satisfactory engine. Needless to say, as the pollution by-products are reduced and engine efficiency is thus likewise reduced, the amount of fuel necessary to produce a given power output is increased.

Two primary alternatives have been suggested as a replacement for the standard internal combustion engine. Although it is noteworthy that recent attempts have been made to utilize a rotary engine as a replacement for the internal combustion reciprocating engine, it should be understood that the rotary engines of the present designs are merely 4-cycle engines which go through the same basic cycle as a standard reciprocating engine and are therefore plagued with the same compromise between engine efficiency and pollution by-products. The first substantial alternative to this basic cycle has been the turbine engine which is commonly used in aircraft but which has only been used experimentally for road vehicles. Beyond a certain size and horsepower class, the gas turbine engine equals and may even exceed the efficiency of the standard reciprocating gasoline engine. Thus, at the present time, virtually all large aircraft are powered by gas turbines. These turbines are designed to compress air or a fuel and air mixture through a rotary fan or turbine blade, to burn the gasoline and air mixture (or to inject gasoline or other fuel after compression) and to drive a second rotary fan or turbine wheel with the output of the combustion chamber. The output of this second wheel, commonly called the hot wheel, is used to drive a vehicle through a drive train and may be additionally used to drive the compressor wheel. The primary difficulty with the standard gas turbine is that, as with the 4-cycle engine, in order to make the turbine efficient, the compression ratio through the compressor or cold wheel must be quite high. There is, therefore, a similar compromise between fuel efficiency and pollution by-products. In addition to this difficulty, the turbine engine, while being quite efficient in horsepower ratings above 500 horsepower, is highly impractical for low horsepower requirements, such as used in standard automobiles, since the required compression ratio typically requires many stages of compression in plural cold wheels, which is economically feasible with very large engines but is impossible or at least impractical in a small automotive power plant. This problem has been commercially alleviated through the use of recuperators, which transfer some of the heat coming out of the exhaust of the gas turbine to heat the inlet air to the compressor and thus raise the temperature of the air before combustion. This technique replaces some of the direct fuel heating required in the combustion chamber and reduces the fuel consumption to a certain extent. Such recuperators, particularly in small gas turbines become very complex mechanically and, since they add substantially to the cost of the equipment, are impractical for use in standard automobiles.

The second alternative to the internal combustion engine which has been experimented with for many years is the steam engine. The steam engine has the inherent advantage of allowing external combustion, that is, combustion of a fuel outside of a confined combustion chamber which is used to drive the engine directly. However, it has the substantial disadvantage of requiring continual addition of water, since there is a significant attrition loss of water during operation. Thus, the steam engine requires the transportation of large amounts of water, which substantially increases the vehicle weight and therefore decreases the ultimate efficiency of the vehicle. It should be noted, however, that substantial experimentation and research has been accomplished in the steam engine field to develop a clean burning combustion chamber. Hence, it is not necessary, in a steam engine, to compromise efficiency with pollution characteristics, since clean burning fuels which do not contain antidetonant or anti-knock features may be used and the temperature and duration of

SUMMARY OF THE INVENTION

The present invention utilizes the primary advantages of each of the three primary engines discussed above, that is, the 4-cycle reciprocating gasoline engine, the turbine engine and the steam engine, while at the same time avoiding the primary disadvantages of each, so that both fuel economy and a reduction in noxious combustion by-products may be achieved without compromising one of these factors against the other.

The engine utilizes a positive displacement compressor similar to the piston and cylinder combination used to compress the gas in a reciprocating internal combustion engine. However, the positive displacement compressor in the present invention compresses air alone and the compression ratio may therefore be set as desired to produce maximum engine efficiency without concern for air pollution consequences. This positive displacement compressor, in turn, feeds the compressed air to a heating system which raises the temperature of the compressed air so that the air pressure is substantially increased and the heated compressed air is then transferred to a drive turbine which rotates about a central shaft to produce output power which, in the case of a vehicle, requires connection to the drive train of the vehicle. The turbine shaft, in addition, is connected to the positive displacement compressor to drive the compressor. Thus, the advantage of the high efficiency turbine hot wheel or drive blade is utilized while at the same time the turbine compressor is of positive displacement type so that high compression ratios may be achieved without the use of multiple compressor stages, and without the necessity for recuperators to raise the temperature of the input gas.

The heating system of the present invention may incorporate any source of thermal energy for heating the gas which has been compressed in the positive displacement compressor. Thus, for example, if a ready source of heat is available in an industrial establishment, a heat exchanger may be utilized to transfer heat directly to the compressed gas. In this way, both the positive displacement compressor and the output turbine wheel run on pure air, so that the lubrication and wear problems in both the compressor and the turbine wheel are substantially reduced in comparison with devices which must run in the dirty environment of combustion products. In the preferred embodiment for use with a vehicle, a heat exchanger is used for raising the temperature of the gas between the positive displacement compressor and the turbine wheel, but the heat exchanger is supplied with the product of combustion of a fuel. Thus, for example, an external combustion chamber such as those which have been developed for use with steam engines may be used to cleanly and efficiently burn fuel to produce hot combustion products. These combustion products are then passed through a counter-flow heat exchanger, through which the compressed air also passes, so that the heat from the combustion products is transferred to the air, raising the temperature of the air without adding impurities, so that this heat energy may then be passed to the turbine wheel. As with a standard automobile engine, the amount of the fuel burned in the external combustion chamber may be controlled in response to an accelerator control so that the amount of heat transferred to the compressed air may be varied and the output torque of the turbine regulated.

It has been found during the development of this engine that substantial inertia, both mechanical and thermal, is present in a system which includes both an external combustion chamber and a heat exchanger. Therefore, in order to provide rapid response of the engine to rapid changes in the position of the accelerator, it has been found advantageous to include a heat storage element, such as a matrix of high heat capacity material, which may be heated during steady state operation of the engine. Thus, for example, a small portion of the combustion products from the combustion chamber may be passed in a heat-exchange relationship through the heat storage element, and the passage of such combustion products may be controlled so that the temperature of the heat storage element is maintained at a desired level. A portion of the output of the positive displacement compressor may then be channelled in heat exchange relationship with the heat storage unit during peak engine demand, that is, when the accelerator is opened abruptly, so that heat may be removed from the heat storage element for a short period of time to assure immediate response of the turbine to such sudden engine demands.

Since the turbine is directly connected to drive the positive displacement compressor, the engine will produce deceleration characteristics very similar to those of the standard internal combustion gasoline engine. That is, the compressor will pump air whenever it is driven, and will thus tend to decelerate the vehicle when the amount of fuel supplied to the combustion chamber is insufficient to drive the automobile at its current rate of speed. It can therefore be seen that, in terms of both acceleration and deceleration, the engine of the present invention has characteristics very similar to those of the standard reciprocating gasoline engine. In addition, if the heat exchanger is made to be highly efficient, the engine efficiency may be comparable to that of an internal combustion engine while the combustion by-products may be kept at a minimum by carefully controlling the characteristics of the external combustion chamber.

In order to keep the thermal loss to the ambient atmosphere as low as possible, it has been found advantageous to couple the output air from the turbine, which may still be at a temperature substantially above ambient, into the combustion chamber to provide all or a substantial part of the air which will be used in the combustion process. Thus, the only air which is conducted through the engine to the ambient atmosphere is that which is passed through the heat exchanger, and, if the heat exchanger is sufficiently efficient, the thermal energy discarded out of the vehicle exhaust will be extremely low.

As an additional feature, the positive displacement compressor is advantageously cooled, as by a standard water jacket around the cylinder walls connected to a radiator exposed to the ambient atmosphere. Although a certain amount of heat which is generated in the adiabatic temperature rise of the gas during compression is lost by thus cooling the cylinder walls, the mass flow of air through the engine may be substantially increased. Since the operation of the drive turbine is determined by the mass flow of air through the turbine blades, it is important to keep this mass flow as high as possible. Thus the gas output from the positive displacement compressor is only slightly above ambient temperature, which, in addition to increasing the mass air flow through the engine, substantially reduces the temperature of the exhaust gas from the engine, avoiding any dangers which may be caused by extremely hot gas passing from the tail pipe of the automobile.

An additional feature of the present invention is the use of a variable area inlet nozzle to the turbine drive wheel, which allows the turbine to run at maximum efficiency regardless of turbine speed. The area of the nozzle is controlled directly in response to the rotational rate of the turbine and, in the preferred embodiment, is controlled by a zero displacement fluid pump which has a pressure output which is proportional to the rate at which the pump is driven. By connecting the pump directly to the turbine shaft, and by connecting the pump output to control a hydraulic actuator to vary the turbine nozzle area, the turbine nozzle opening is controlled directly in accordance with the engine speed.

These and other advantages of the present invention may best be understood by reference to the drawings in which:

FIG. 2 is a schematic illustration of the fuel control, the starter control, and the peak engine demand control of the present invention; and FIG. 3 is a schematic illustration of the operation of the variable area nozzle control of the present invention.

Figure 1:
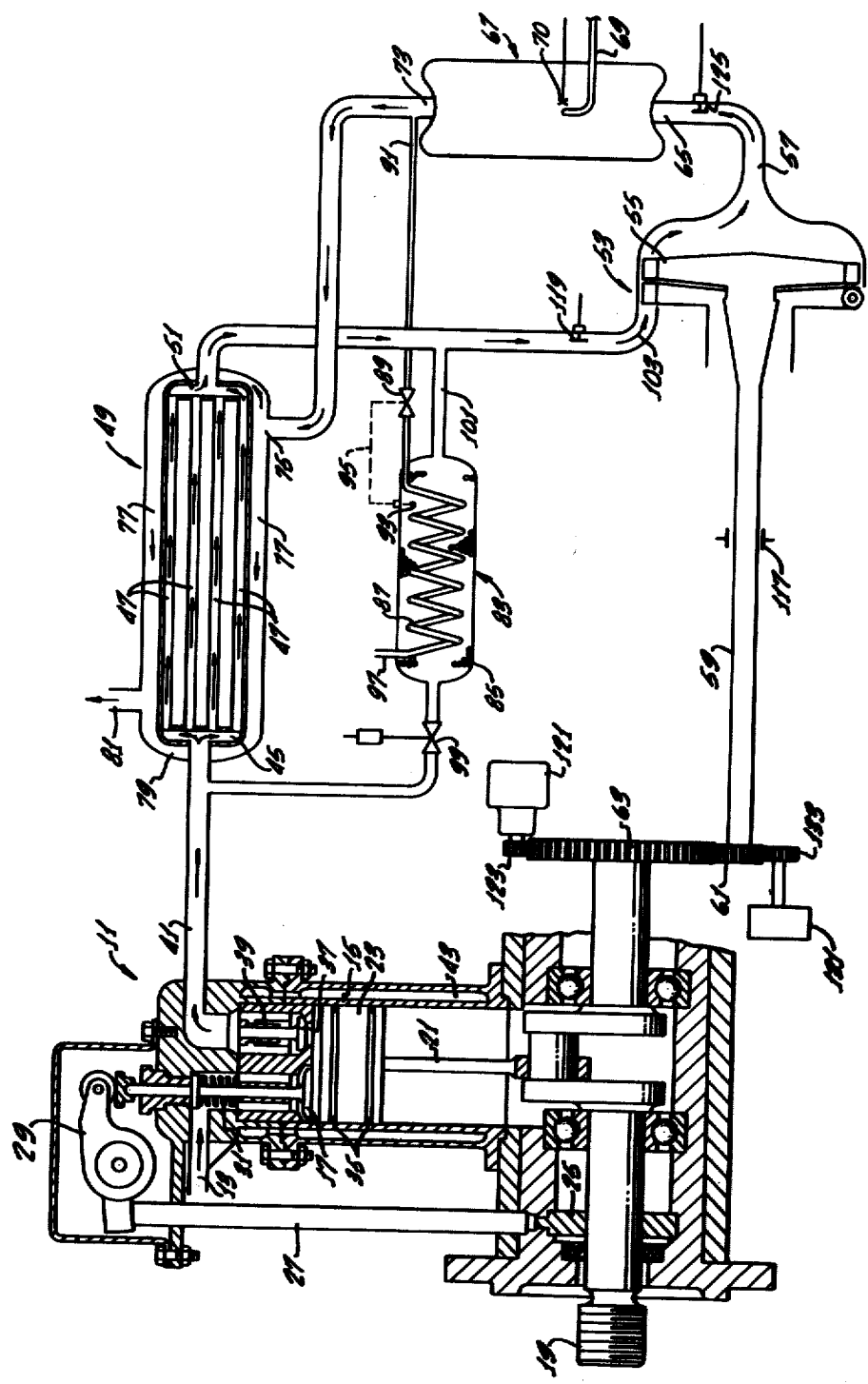
FIG. 1 is a schematic illustration, partially in section, of the engine of the present invention, showing both the flow of mechanical energy and the flow of gas through the engine.

Referring initially to FIG. 1, a positive displacement compressor such as the reciprocating compressor 11 has an intake port 13 for drawing ambient air from the atmosphere. This intake port 13 is ducted to a cylinder 15 by way of an intake valve 17 which is opened and closed in synchronism with the rotation of a crank shaft 19 which is used to drive the positive displacement compressor 11. More specifically, the crank shaft 19 is connected to a piston rod 21 which is in turn connected to the piston 23 of the reciprocating compressor 11, and the crank shaft 19 includes a cam 25 rigidly mounted to the crank shaft 19. This cam 25, through a push rod 27 and rocker arm 29, reciprocates the intake valve 17 against the bias of a spring 31. It will be noted that the combination of the crank shaft 19, rod 21, piston 23 and cylinder 15, along with the intake valve 17, is very similar to the normal configuration in an internal combustion 4-cycle engine. It should be noted, however, that, rather than utilizing a separate cam shaft to drive the push rod 27, the cam 25 in this instance is directly connected to the crank shaft 19 so that the intake valve 17 will be opened once during each cycle of the piston 23. In operation, the cam 25 will open the intake valve 17 when the piston 15 is at or near the top of its stroke and will close the valve 17 when the piston 23 has reached the bottom of its stroke. Thus, during the downward stroke of the piston 23, the intake valve will be open and air will be drawn into the cylinder 15 through the intake port 13 until the piston 23 reaches its lowest position. At this lowest position of the piston 23 the intake valve 17 will close and the piston will compress the air which has been drawn into the cylinder 15 during its upward stroke.

The crank shaft is designed to rotate within bearings 33 and the piston 23 may include piston rings 35 for sealing the piston 23 against the cylinder wall 15. It will be realized that, since only air is being pumped through the reciprocating compressor 11, the piston rings 35 may be manufactured from synthetic material such as Teflon in order to make the piston 23 operate at a high efficiency without the introduction of substantial frictional losses.

An exhaust valve 37 is also included in the cylinder 15, but, rather than being reciprocated to open and close in synchronism with the movement of a piston 23, is operated as a pressure sensitive one-way valve. Thus, the exhaust valve 37 is biased to a closed position by a spring 39 so that the valve 37 is open only when the air pressure within the cylinder 15 exceeds the pressure in an exhaust port 41 leading from the exhaust valve 39. Thus, the duration of the total cycle of the piston 23 during which the exhaust valve 37 is open will be determined by the pressure within the exhaust port 41, such that, if the pressure in the exhaust port 41 is relatively low, the valve 37 will open after the piston 23 has moved only a short way through its stroke, whereas, if the pressure in the exhaust port 41 is relatively high, the exhaust valve 37 will open only after the piston 23 has proceeded through a substantial portion of its upward stroke. In either case, the exhaust valve 37 will close immediately after the piston 23 has reached top dead center and has initiated its downward movement within the cylinder 15.

It should be noted that, while a reciprocating compressor 11 is shown in the drawings, any positive displacement compressor may be used, such as rotary positive displacement compressors modeled in accordance with the many rotary internal combustion engine designs which have been developed. The Wankel engine structure, for example, provides an adequate positive displacement compressor design for this purpose.

The cylinder 15 is preferably cooled by a water jacket 43 or may be air cooled by fins (not shown). This cooling system 43 removes a substantial portion of the adiabatic temperature rise in the air within the cylinder 15 during compression, so that the temperature in the exhaust port 41 is maintained at approximately 350°F or lower, regardless of the compressor ratio of the positive displacement compressor 11. The cooling of the air during compression provides two advantages. First, the mass flow of air out of the positive displacement compressor 11 will be determined by the adiabatic temperature rise which is allowed to occur within the cylinder 15. By maintaining the temperatures within the cylinder 15 at a moderate level, the mass air flow may be substantially increased and therefore the efficiency of the entire engine system enhanced. Secondly, as will be explained below, the temperature of the ultimate exhaust from the engine will be dependent upon the temperature of the air in the exhaust port 41 and it is desirable to maintain this temperature at moderate levels so that the ultimate exhaust gas which passes from the vehicle may be maintained at a level which is not injurious to surrounding persons and objects.

The exhaust port 41 is connected to an inlet manifold 45 of a first set of channels 47 of an efficient counterflow heat exchanger 49. This heat exchanger 49 is designed to increase the temperature of the gas entering the manifold 45 so that the pressure of the gas reaching an outlet manifold 51 of the first channel 47 will be substantially increased. In a typical system, the temperature at the exhaust manifold 51 of the heat exchanger 49 will be approximately 1,700°F.

The increased kinetic energy of the air resulting from the heating of the air within the heat exchanger 49 is used to drive a turbine 53. The turbine 53 includes a turbine wheel or hot wheel 55 which, in the preferred embodiment, is of the inflow radial type, although it is also possible to build a satisfactory engine using an axial flow turbine. The compressed, heated air from the exhaust manifold 51 the heat exchanger 49 is therefore expanded in a controlled manner as it passes the turbine wheel 55 and the energy which has been stored within the air is released as mechanical energy in the turbine wheel 55. The exhaust port 57 of the turbine 53 therefore passes the air at a substantially reduced pressure and temperature from the turbine 53. In a typical system, the temperature in the exhaust manifold 57 is approximately 1,000°F and the pressure in the exhaust manifold 57 is only slightly above ambient pressure.

The turbine wheel 55 rotates about a main turbine shaft 59 which is mounted in bearings (not shown) which may typically be of a gas bearing type, a grease-packed bearing type or may be mist lubricated. It is advantageous to incorporate thermal resistance along the main turbine shaft 59 in order to protect the gear box components from heat transmitted from the turbine wheel 55. Such a thermal resistance, for example, may be in the form of a heat dam incorporating an air slinger along the turbine shaft. These elements are common to the turbine art and are therefore not specifically shown or disclosed in this application. The main turbine shaft 59 is used to provide output power and, in the case of a vehicle, is therefore connected, as by a gear train (not shown), to the drive train of the vehicle to produce motive power. In addition, the main turbine shaft 59 is connected through a pair of gears 61 and 63 to drive the positive displacement compressor drive shaft 19 at a reduced rate. Since the positive displacement compressor 11 is subjected only to clean air, without any combustion by-products, a common lubrication system may be used to lubricate the bearings 33 and the gear train 61 and 63 without concern for damage to these elements due to foreign particles.

Since, as explained above, the temperature of the exhaust gas in the turbine manifold 57 is approximately 1,000°F, it is desirable to utilize the kinetic energy within this exhaust gas in order to maintain the high efficiency of the engine system. Therefore the exhaust manifold 57 is connected to an air intake duct 65 of a fuel combustion chamber 67. As explained above, the pressure at the exhaust manifold 57 is relatively low, but is sufficient to maintain the flow of air to the remainder of the system. Fuel is added to the combustion chamber 67 through a fuel intake line 69 and is ignited by means of a spark plug or similar device 70 within the combustion chamber 67. It will be understood that once the combustion process is in process, the use of such an igniting device 70 may be unnecessary. The combustor 67 is of the external combustion type, that is, it is not subject to the severe pressure and timing conditions which are posed by an internal combustion cycle, and, therefore, the fuel which is utilized in the engine and applied to the fuel line 69 may be of almost any type. Therefore the engine permits the use of clean burning fuels and fuels which do not contain antidetonant or anti-knock characteristics.

A substantial amount of research and development has been accomplished in the steam engine field and in order to develop clean burning combustion chambers, particularly by strict control of the air flow through the combustion chamber in order to control the duration of time during which the fuel is allowed to burn before it is quenched by air flowing through the combustion chamber. It is, therefore, desirable to utilize such advanced combustion chambers for the combustion chamber 67 in order to reduce so far as possible the noxious by-products of combustion. It will be readily recognized, however, that any combustible product may be introduced into the combustion chamber 67, since engine operation is dependent only upon the heating of air entering at the intake duct 65.

An exhaust port 73 connects the combustion chamber 67 to the intake manifold 75 of a second channel 77 in the counter-flow heat exchanger 49, and the combustion products then flow through an exhaust manifold 79 of this second channel 77 to an exhaust port 81. The efficiency of the entire engine is dependent to a great extent upon the efficiency of the heat exchanger 49, and it is therefore desirable that substantially all of the thermal energy within the gas leaving the combustion chamber 67 be transferred to the compressed gas entering the counter-flow heat exchanger 49 at the intake manifold 45. Since the compressed air from the positive displacement compressor 11 has been cooled, it is possible to maintain the temperature of the exhaust gas leaving the exhaust port 81 at approximately 350°F during steady state engine operation.

The basic engine thus far described overcomes one of the severe disadvantages of small gas turbine engines in that the compression ratio may be made as high as desirable through the use of a single stage positive displacement compressor 11. In addition, the compressor 11 and turbine 53 may both be made to operate efficiently and to have a long reliable life due to the passage of only clean filtered air through these systems. It will be readily understood that, while a combustion chamber 67 has been shown for the purpose of adding thermal energy to the air as it passes through the heat exchanger 49, the heat exchanger will operate effectively in response to any source of heat and thus, for example, if the engine of this invention is to be used as a stationary power source, a flow of steam or other thermal source may be used to supply heat to the heat exchanger 49 to provide the thermal energy required to drive the turbine 53.

It will be recognized that there is substantial thermal inertia and additional mechanical inertia in the operation of the combustion chamber 67, the heat exchanger 49, and the turbine wheel 55, so that the engine system thus far described may operate satisfactorily under steady state operating conditions but may be relatively slow to respond to sudden changes in engine demand requiring peak engine outputs. Likewise, rapid changes in the fuel to air ratio occur in response to sudden engine demand, and these rapid changes may produce undesirable combustion by-products. In order to overcome each of these difficulties in the present engine system, a heat storage unit 83 may be utilized to permit the combustion chamber 67 to operate under smoothly changing fuel to air ratio conditions in order to assure continuous clean exhaust while still providing sudden changes in output power.

This heat storage unit 83, in the preferred embodiment, includes a matrix of heat storage elements such as alumina pellets 85 or any other material having a high heat capacity per unit volume. A first channel 87 through the heat storage unit 83 and in heat exchange relationship with the heat retaining elements 85 is connected through a valve 89 to a connecting port 91 in communication with the exhaust duct 73 of the combustion chamber 67. A thermostatic control 93 is mounted in the heat storage unit 83 in thermal communication with the heat storage elements 85 and is connected, as by a wire 95, to control the operation of the valve 89 in response to the temperature of the elements 85. Thus, during steady state operation of the engine system, exhaust gases are ducted from the exhaust port 73 of the combustion chamber 67 through the valve 89 and the flow channel 87 and out an exhaust port 97 until the temperature of the heat storage elements 85 reaches a predetermined level, at which point the temperature sensing element 93 will cause the control valve 89 to close and the heat storage elements 85 will remain at this predetermined temperature until the ambient atmosphere surrounding the unit 83 cools the elements 85 to a temperature at which the temperature sensing unit 93 will again activate the valve 89. Insulation may be provided around the heat storage unit 83 in order to reduce the required cycling of the valve 89 and the resultant use of heat from the combustion chamber 67 to the greatest extent possible.

A flow control valve 99 is connected to a second flow channel which, in the preferred embodiment, is a channel made up of the spaces within the matrix of the heat storage elements 85. The other end of this second flow channel is connected by means of an output duct 101 to the intake port 103 of the turbine 53. The intake of this second flow channel is connected through the control valve 99 to the output port 41 of the positive displacement compressor 11. Since the air which is allowed to flow from the output port 41 through the control valve 99 passes in direct communication with the heat storage elements 85, it is possible to rapidly transfer heat stored in the heat storage elements 85 to the gas so that the exhaust port 101 may transmit air which is heated to substantially the temperature at which the heat storage elements 85 are maintained. Thus, the valve 99 is controlled as will be discussed below, to enable the air leaving the exhaust port 41 of the compressor 11 to be rapidly heated in response to sudden changes in the demand from the turbine 53, so that the heat storage unit 83 provides a parallel bypass channel around the heat exchanger 49 during such periods and provides rapid response of the engine system to peak demands. The combustion chamber 67 and the heat exchanger 49 can then smoothly increase their thermal output in order to produce a smooth power transition through these elements to the increased power level. The flow of gas through the valve 99 will then be interrupted after the short period of time that it takes for the combustor 67 and heat exchanger 49 to reach the new thermal output level.

Referring now to FIG. 2, the operation of the fuel control system, the starting system and the peak turbine demand control system may be explained. The fuel line 69 shown in FIGS. 1 and 2 is connected to a fuel control valve 103 which is positioned in series with a fuel line 105 connected to the output of a fuel pump 107. The fuel pump 107 is connected to draw fuel from a fuel tank 109 to supply fuel to the combustion chamber 67. A bypass, pressure activated valve 111 is connected in parallel with the fuel pump 107 and permits the fuel pump 107 to operate and maintain a predetermined pressure in the line 105 regardless of the position of the fuel control valve 103. During normal operation of the engine system the position of the fuel control valve 103 is controlled by throttle linkage 113 connected to an accelerator pedal 115, in the case of a vehicle system, and controls the rate of fuel injection into the combustion chamber 67 in accordance with the position of the throttle pedal 115. In addition, an rpm or rate sensor 117, shown in FIG. 1, is connected as shown in FIG. 2 to close the fuel control valve 103 in response to rotation of the main turbine shaft 59 at a rate which exceeds a predetermined maximum acceptable level.

A temperature sensor 119 is installed as shown in FIG. 1 in the inlet port 103 of the turbine 53 and is connected as shown in FIG. 2 to close the fuel control valve 103 in response to temperatures above a predetermined maximum level in the input port 103. Each of these control elements 117 and 119 therefore control the operation of the engine system to assure maximum safety and engine life.

In order to initially start the engine system, a starter motor 121 similar to the starter motor used in standard internal combustion automobile engines is arranged to drive a gear 123 in mesh with the gear 63 to rotate the crank shaft 19 of the positive displacement compressor 11 and the turbine wheel 55. A pressure sensor 125, as shown in FIGS. 1 and 2, maintains the fuel control valve 103 in a closed position at all times when the pressure within the exhaust port 57 from the turbine 53 is below a predetermined level. Therefore, as the starter motor 121 increases the speed of the compressor 11, the pressure in the exhaust port 57 will increase to a level which enables the pressure sensor 125 to open the fuel control valve 103, and fuel will be supplied to the combustion chamber 67. At the same time, the spark plug 70 may be controlled in response to the opening of the fuel control valve 103 to initiate combustion. This control system therefore prevents overheating of the combustion chamber 67 due to a slow rate of air admission thereto and prevents excess fuel buildup within the combustion chamber 67.

The control for the valve 99 of FIG. 1 is likewise shown in FIG. 2 and is responsive to the accelerator pedal 115. A linkage 127 connects the accelerator 115 to a hydraulic damper 129 which is in turn connected to the control valve 99. When the accelerator pedal 155 is moved smoothly and slowly to vary the engine demand, the hydraulic damper or shock absorber 129 will absorb the motion of the linkage 127 and the valve 99 will remain in its normally closed position. If, however, the accelerator pedal 115 is abruptly depressed, the resulting movement of the linkage 127 will be transmitted through the hydraulic damper 129 and the valve 99 will open. The valve 99 is then biased to return to its normally closed position as it compresses the hydraulic damper 129, so that, as shown in FIG. 1, air will flow from the compressor 11 to the heat storage unit 83 through the valve 99 only for a short period of time in response to such rapid acceleration requirements. The valve 99 will then close after a short period of time and the heat storage unit 83 will be brought to its steady state temperature through the operation of the temperature control element 93 and the temperature control valve 89.

Referring now to FIG. 3 the operation of the turbine nozzle will be explained. It is desirable, as known in the turbine art, to control the area of the nozzle through which gas passing from the inlet port 103 shown in FIG. 1 is admitted to interact with the turbine wheel 55. Such a variable area nozzle assures optimum performance of the turbine wheel 55 at various mass air flow rates. Thus, when the turbine is operating at a relatively low rpm and the mass air flow rate is relatively low, it is desirable to maintain the nozzle area small. However, the nozzle area should be relatively large when the turbine is rotating at a rapid rate. As shown in FIGS. 1 and 3, a pump 131 is connected through a gear 133 to the gear 61 which rotates with the main turbine shaft 59. The pump 131 is preferably designed as a zero flow pump which has a pressure output which is proportional to the rate at which the pump 131 is driven. The pump 131 may, for example, be used to pump the lubricating oil which lubricates the bearings 33 and the gears 61 and 63 within the engine sump. The output of the pump 131 is advantageously connected to a hydraulic actuator 135 which is designed to include a piston 137 biased toward one extremity of the hydraulic actuator 135 by a spring 139. The piston 137 is sealed within a cylinder 141 and the connection 143 to the pump 131 provides the only fluid opening to the cylinder 141. As the pressure output of the pump 131 increases, the position of the piston 137 will be adjusted against the bias of the spring 139 to change the position of a linkage 145, which directly controls a variable area nozzle 147 of the turbine wheel 55, reducing the area of the nozzle 147 when the piston 137 is at a position close to the inlet 143 and opening the nozzle 147 when the piston is at the opposite extremity.

From the previous disclosure it can be seen that an extremely efficient low pollution engine system has been disclosed which is designed to have operating characteristics similar to those of the standard internal combustion 4-cycle engine, but which will have a substantially longer life due to the disassociation of moving elements from any interaction from combustion by-products.

What is claimed is:

1. Apparatus for driving a vehicle, comprising in combination:
   a combustion chamber for mixing air with fuel and burning this mixture to produce output combustion products;
   means for supplying fuel under pressure to said combustion chamber;
   a heat exchanger including first and second independent thermally interactive flow channels, said first flow channel connected at one end to said output combustion products of said combustion chamber, said first channel connected at its other end to an exhaust outlet;
   a positive displacement compressor for compressing a fluid, the output of said compressor being conducted to one end of said second flow channel of said heat exchanger;
   a fluid drive mechanism, the fluid inlet of which is connected to the other end of said second flow channel of said heat exchanger, said fluid drive mechanism adapted to drive said vehicle and said compressor; and
   heat storage means connected to receive heat from the output combustion products of said combustion chamber, said heat storage means comprising:
      a heat storage element; and
      a heat exchanger including first and second independent flow conduits, each of said flow conduits being thermally interactive with said heat storage element, said first flow conduit connected between said compressor and said fluid drive mechanism, said second flow conduit connected to said combustion chamber.

2. Apparatus as defined in claim 1 additionally comprising means responsive to the temperature of said heat storage element for selectively closing said second flow conduit of said heat storage means.

* * * * *